May 14, 1946. C. L. DYKE 2,400,107
LOW AIR PRESSURE ALARM FOR PNEUMATIC VEHICLE TIRES
Filed Dec. 31, 1943
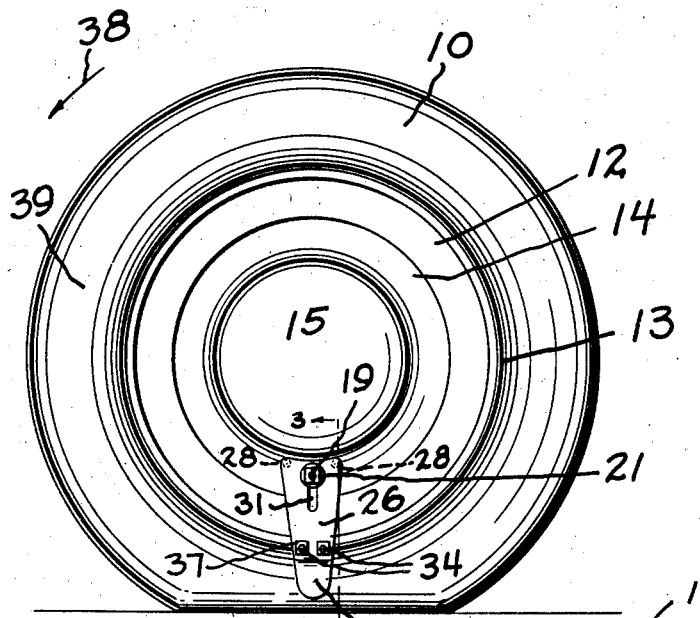
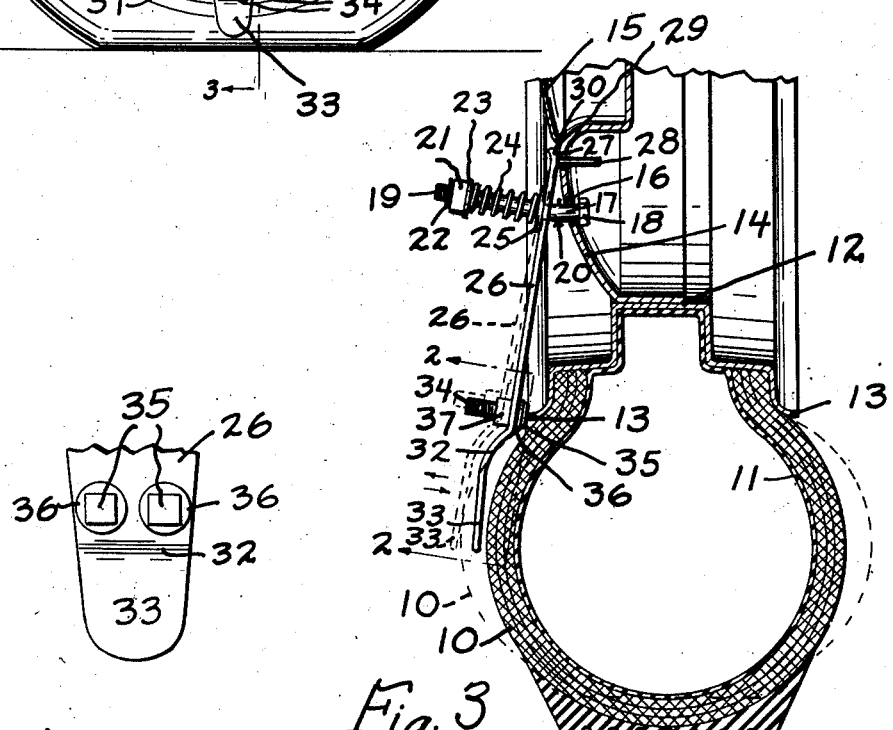
INVENTOR.
Charles L. Dyke
BY
*Sam J. Slotsky*
ATTORNEY Patented May 14, 1946

2,400,107

UNITED STATES PATENT OFFICE 2,400,107

LOW AIR PRESSURE ALARM FOR
PNEUMATIC VEHICLE TIRES

Charles L. Dyke, Orange City, Iowa

Application December 31, 1943, Serial No. 516,417

1 Claim. (Cl. 116—34)

My invention relates to an alarm for pneumatic vehicle tires.

An object of my invention is to provide an alarm which will indicate to the driver when the pressure in the tire is low, so that the pressure can be then replenished.

A further object of my invention is to provide a low pressure alarm which does not require cumbersome, or impractical electrical contacts.

A further object of my invention is to provide a simple and inexpensive device which can be easily attached to the wheel upon which the tire is mounted.

A further object of my invention is to provide a device which includes a clapper or striking member which will set up a series of clearly audible raps or impacts thereby providing an alarm device.

A further object of my invention is to provide the above mentioned device in a construction which can be carried by a rapidly rotating wheel without distortion or mechanical disturbance of its parts.

With these and other objects in view, my invention consists in the construction, arrangement, and combination of the various parts of my device, whereby the objects contemplated are attained, as hereinafter more fully set forth, pointed out in my claim, and illustrated in the accompanying drawing, in which:

Figure 1 is a side elevation of a pneumatic tire employing my arrangement,

Figure 2 is a view taken along the lines 2—2 of Figure 3, and

Figure 3 is an enlarged detail taken in section substantially along the lines 3—3 of Figure 1.

My invention contemplates the provision of a simple striking or clapper member which is suitably pivoted adjacent a pneumatic tire, and so arranged that when the pressure in the tire drops unduly beneath a pre-determined point, the bulge set up by the tire at the lower portions thereof, and at the instant the bulge is formed, will cause the aforesaid clapper member to be momentarily carried away from engagement with the tire rim, and as soon as the clapper member passes this lower point, it will be spring urged toward the rim, so that the sequence of these effects will cause a chattering action clearly audible to the driver.

I have used the character 10 to designate a tire casing, with the character 11 (see Figure 3) indicating the inner tube, the character 12 the rim channel, and the character 13 the substantially arcuate outer rim beads. The supporting rim disc is indicated by the character 14, and the hub cap by the character 15. I provide an opening 16 in the member 14 in which opening is loosely engaged a stud 17 having the head 18, which stud extends outwardly in the threaded portion 19. A cotter pin 20 passes through the stud 17 as shown. Threadably engaged with the extremity 19 is a nut 21 which is retained against outer movement by means of a further cotter pin 22 and the nut 21 bears against a washer 23 which in turn bears against a coiled spring 24 which receives the threaded portion 19.

The spring 24 bears against a further washer 25 which washer in turn bears against the clapper member 26. The member 26 is attached at 27 to a pair of pins 28 which are received loosely through the substantially larger openings 29 formed in the disc member 14. The clapper member 26 is also slightly curved at 30 to provide a smooth rocking action at this point, and the clapper member also includes a lengthened slot 31 through which the stud 17 passes. The clapper member 26 extends into the curved portion at 32 which terminates in a casing engaging portion 33, and passing through the member 26 are a pair of studs 34 having the square heads 35 which underlie the washers 36, this arrangement being tightened and held by means of the nuts 37.

It will be noted that the square heads 35 normally rest directly against the bead 13.

The clapper member 26 can be made of any suitable material as long as it sets up a noise producing impact and includes the necessary characteristics and vibratory action in combination with the rim to produce the proper sound effect. The member 26 can also be made with exterior ornamentation thereon.

The device operates in the following manner. Normally, when the pressure in the tire is sufficient, the casing will be fully inflated as shown in Figure 3 by the solid lines. It will be noted from Figure 3 that the end portion 33 of the clapper member 26 is a slight distance from the casing wall, allowing the square heads 35 to be in abutment with the rim portion 13. The spring 24 will maintain such engagement, and the tire will normally rotate without producing any sound effects. However, when the pressure in the tube and casing drops, the casing will bulge as shown by the dotted lines in Figure 3, which bulge however will be present only at the bottom of the tire or where it contacts with the roadway. Now, assuming that the casing 10 is rotating in the direction of the arrow 38 in Figure 1, it will be noted that when the portion 33 is at a point such as approximately indicated by the character 39, there will be no bulge at this point, and the clapper heads 35 will be in snugly abutting relation against the rim portion 13. As the casing rotates further, however, the clapper member 26 will be carried to the downward position as shown in Figure 1, and at the same time the pronounced bulge will be formed at this point which will correspondingly carry the clapper member 26 outwardly as shown by the dotted lines in Figure 3. As soon as the clapper member passes the bulge producing position, it will be released from engaging with the bulge and the heads 35 will strike against the rim portion 13, so that as a result the rotation of the wheel will carry the clapper member outwardly, and the spring will return it inwardly in rapid sequence thereby producing a clearly audible signal of a chattering or staccato nature which will indicate to the driver that the pressure in the casing is lower than desired.

For adjustment purposes, or to adjust to lower normal pressures which the tire will carry, an additional washer or washers 36 can be used as spacers to carry the portion 33 further outwardly. The pins 28 and the arcuate portion 30 permit a smooth rocking action at the uper end of the clapper member 26, and the slot 31 permits pivotal movement of the stud 19. It will be further noted that the device can be quickly attached or removed by simply removing the nut 21, etc. It should also be understood that if desired, more than one clapper arrangement can be employed on each tire; for instance another unit could be used directly opposite to that shown in Figure 1. Also the wheel can be balanced in the usual manner if only one is used by positioning the bolts to provide a balancing effect, or by attaching any suitable weight arrangement in opposed relation to the clapper unit.

It will now be seen that I have provided all of the advantages mentioned in the objects of my invention, with other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

A low pressure alarm for pneumatic vehicle tires comprising a clapper member having a clapping portion normally spring urged to forcibly strike against a portion of a vehicle rim when released, means produced by the ground engaging bulge formed by low pressures in the tire for carrying said clapper member outwardly at said bulge to correspondingly provide a rapid staccato sound effect as the tire rotates, said clapper member including an extending casing engaging portion adapted to be carried outwardly when said bulge is produced, means for pivoting said clapper member on a wheel, said spring urged means including a coiled spring adapted to bear against said clapper member, means for supporting said coiled spring, including a stud received within said spring and anchored at one end on the wheel, said clapper member including an opening receiving said stud, means on the stud for retaining said spring against said clapper member, said coiled spring being positioned between the pivoting point of said clapper member and the lower end of the clapper member.

CHARLES L. DYKE.